(12) United States Patent
Morgan et al.

(10) Patent No.: US 12,042,083 B2
(45) Date of Patent: Jul. 23, 2024

(54) MILK FROTHING DEVICE

(71) Applicant: Breville Pty Limited, Alexandria (AU)

(72) Inventors: Andrew Robert Morgan, Alexandria (AU); Norman Oliveria, Alexandria (AU); Gerard White, Alexandria (AU); Robert Grassia, Alexandria (AU)

(73) Assignee: Breville Pty Limited, Alexandria (AU)

( * ) Notice: Subject to any disclaimer, the term of this patent is extended or adjusted under 35 U.S.C. 154(b) by 539 days.

(21) Appl. No.: 17/311,661

(22) PCT Filed: Dec. 9, 2019

(86) PCT No.: PCT/AU2019/051347
§ 371 (c)(1),
(2) Date: Jun. 7, 2021

(87) PCT Pub. No.: WO2020/113288
PCT Pub. Date: Jun. 11, 2020

(65) Prior Publication Data
US 2022/0104651 A1 Apr. 7, 2022

(30) Foreign Application Priority Data

Dec. 7, 2018 (AU) .............................. 2018904657
Jun. 28, 2019 (AU) .............................. 2019902263

(51) Int. Cl.
*A47J 31/44* (2006.01)
*A47J 31/60* (2006.01)
(52) U.S. Cl.
CPC ....... *A47J 31/4489* (2013.01); *A47J 31/4485* (2013.01); *A47J 31/60* (2013.01)

(58) Field of Classification Search
CPC .... A47J 31/4489; A47J 31/4485; A47J 31/60; A47J 31/56; A47J 31/30; A47J 31/46;
(Continued)

(56) References Cited

U.S. PATENT DOCUMENTS

| 2012/0192720 | A1 | 8/2012 | Cesaro |
| 2015/0013545 | A1* | 1/2015 | Egli ..................... B67D 1/0079 |
| | | | 222/129.1 |
| 2017/0079464 | A1* | 3/2017 | Apone ................ A47J 31/4496 |

FOREIGN PATENT DOCUMENTS

| JP | H07100063 A | 4/1995 |
| WO | WO 2014165911 A2 | 10/2014 |

(Continued)

OTHER PUBLICATIONS

International Search Report for Australian Application No. PCT/AU2019/051347, dated Feb. 24, 2020.
(Continued)

*Primary Examiner* — Phuong T Nguyen
(74) *Attorney, Agent, or Firm* — MOSER TABOADA

(57) ABSTRACT

There is disclosed herein a coffee machine (10) including: a body (12); a steam wand (14), to froth milk, attached to the body (12); and a cleaning mechanism (20), the cleaning mechanism (20) including: a stem (22) having a first end portion (24) attached to the body (12), and a second end portion (26) extending longitudinally away from the first end portion (24); and a supply of water under pressure to deliver water to the second end portion (26), wherein water under pressure is delivered to the second end portion (26) to produce at least one water jet directed at the steam wand (14).

15 Claims, 14 Drawing Sheets

(58) Field of Classification Search
CPC .. A47J 31/10; A47J 31/24; A47J 31/40; A47J 31/4403; A47J 31/00; A47J 31/44
USPC .......... 99/280, 284, 285, 293, 294, 295, 300
See application file for complete search history.

(56) References Cited

FOREIGN PATENT DOCUMENTS

| | | |
|---|---|---|
| WO | WO 2017/048637 A1 | 3/2017 |
| WO | WO-2017085615 A1 | 5/2017 |

OTHER PUBLICATIONS

Supplementary European Search Report for 19893790.6 dated Jul. 27, 2022.

* cited by examiner

MILK FROTHING DEVICE

FIELD

The present invention relates to devices to texture a liquid, such as milk frothing devices, and more particularly to such devices adapted to at least partly self-clean a coffee machine steam wand.

BACKGROUND

There are many devices to heat and/or froth milk for the purposes of providing the heated frothed milk for coffee. An example of such a milk frothing device is in the form of a steam wand, or a stem, that is attached to a coffee machine. Typically, the outside of the steam wand is cleaned by an operator who wipes the steam wand with a damp cloth. The stem may include a "whisk" at its lower end that is rotated rapidly in order to froth the milk.

More recently, a milk frothing device has been developed that froths the milk by shearing the milk. An example of such a milk frothing device is disclosed in International Application PCT/AU2018/000107.

A disadvantage of the above discussed milk frothing devices is the difficulty in respect of cleaning milk from the devices. For example, bacteria may be spread onto the steam wand if the cloth that is used to clean the wand is not clean. A further disadvantage is that if a damp cloth is used to clean the steam wand, the wand may get clogged or blocked, which presents performance and reliability issues for the coffee machine.

SUMMARY

It is an object of the present invention to overcome or substantially ameliorate at least one of the above disadvantages.

There is disclosed herein a coffee machine including:
a body;
a steam wand, to froth milk, attached to the body; and
a cleaning mechanism, the cleaning mechanism including:
  a stem having a first end portion attached to the body, and a second end portion extending longitudinally away from the first end portion; and
  a supply of water under pressure to deliver water to the second end portion,
  wherein water under pressure is delivered to the second end portion to produce at least one water jet directed at the steam wand.

Preferably, the cleaning mechanism further includes a cavity extending between the first and second end portions of the stem,
wherein the supply of water under pressure delivers water to the cavity; and
the stem has at least one aperture located at the second end portion and to which water under pressure is delivered to the cavity to produce the at least one water jet directed at the steam wand.

Preferably, the steam wand is movable between a first position at which the wand can froth milk and a second position where the wand can be cleaned by the cleaning mechanism, wherein in the second position, the steam wand is closer to the stem of the cleaning mechanism, than when the steam wand is in the first position.

Preferably, the supply of water under pressure is a pump mounted in the body.

Preferably, the stem includes a head at the second end portion, the head having each aperture.

Preferably, the head is arcuate shaped and has two end extremities which provide a gap through which the steam wand can pass, when the wand is moved between the first position and the second position.

Preferably, a water tank to store water is located within the coffee machine.

Preferably, the pump is in fluid communication with the water tank, and each aperture and can pump pressurised fluid through each aperture of the head.

Preferably, one or more conduits are in fluid communication with the water tank, pump and each aperture.

Preferably, when the steam wand is moved to the second position, it can engage a switch attached to the body of the coffee machine to activate the pump of the cleaning mechanism and thereby clean the steam wand.

Preferably, there is a delay of about 3 seconds from when the switch is engaged to when the pump activates.

Preferably, when the steam wand is in the second position, an operator can select a steam wand cleaning function located in a user interface of the coffee machine.

Preferably, the steam wand has an aperture located at one end to expel steam, the cleaning mechanism directed to clean a portion of the end of the steam wand, when the wand is located in the cleaning position.

Preferably, the coffee machine further includes a safety switch located in the base of the coffee machine to detect the presence or absence of an object on the base, whereby the cleaning mechanism is activated in the absence of the object on the base.

There is also disclosed herein a coffee machine including:
a body;
a steam wand, to froth milk, attached to the body; and
a cleaning mechanism, the cleaning mechanism including:
  a stem having a first end portion attached to the body, and a second end portion extending longitudinally away from the first end portion, and a cavity extending between the first and second end portions of the stem;
  a supply of water under pressure to deliver water to the cavity,
  wherein the stem has at least one aperture located at the second end portion and to which water under pressure is delivered to the cavity to produce at least one water jet directed at the steam wand.

There is also disclosed herein an assembly to froth a liquid, the liquid being located in a container with the container having an open top, the assembly including:
a base to receive the container at a predetermined position relative to the base;
a frothing stem, having a lower end to be located in the liquid to froth the liquid, and mounted on the base for movement between an operative position at which the stem is to project into the container to froth the liquid, and a retracted position providing for movement of the container to and from the predetermined positions, with the stem being positionable at a cleaning position to locate the lower end thereof at a cleaning location;
a supply of water under pressure; and
a nozzle connected to the supply so as to receive water under pressure therefrom so as to produce a water jet, with the nozzle positioned and oriented to direct the water jet at said cleaning location to at least partly clean the lower end.

Preferably, the stem is mounted on the base for movement relative to the base so that the operative position is lower than the retracted position.

Preferably, said movement is generally linear.

In an alternative preferred form, said movement is angular about a generally horizontal axis.

Preferably, the cleaning position is displaced from the retracted position and the operative position.

In an alternative preferred form, the cleaning position is at or adjacent the operative position.

Preferably, the assembly further includes ducting extending from the supply to deliver water to the stem at a position spaced from lower end thereof so that water flows over the stem to at least partly clean the stem.

Preferably, the nozzle is oriented so that said water jet travels upwardly to engage said lower end.

Preferably, the device further includes a shroud mounted on the stem for vertical movement therealong to at least aid in cleaning the stem.

BRIEF DESCRIPTION OF THE DRAWINGS

Preferred embodiments of the present invention will be described by way of examples only, with reference to the accompanying drawings.

DETAILED DESCRIPTION OF EMBODIMENTS

Figure 1:
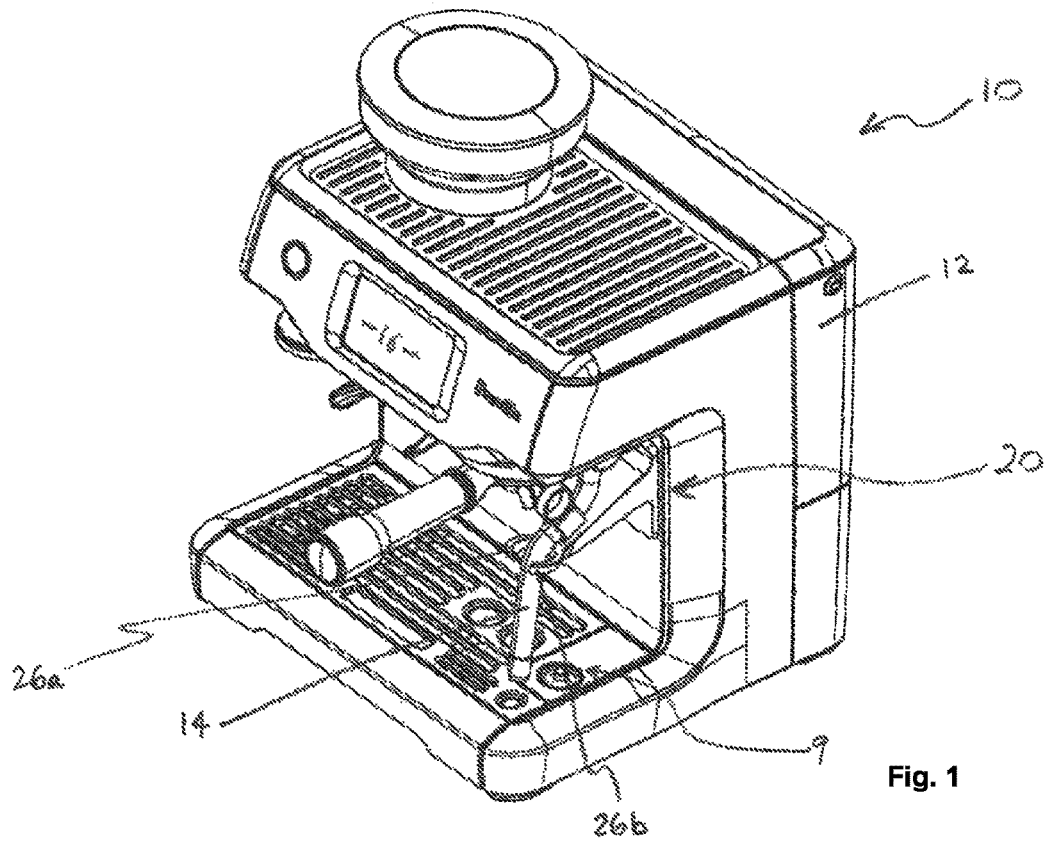
FIG. 1 is a perspective of a coffee machine according to an embodiment, when the steam wand is in the second position.

FIGS. 1 to 8 show a coffee machine 10 according to an embodiment. The coffee machine 10 has a body 12 and a steam wand 14 to froth milk, attached to the body 12. The coffee machine 10 also has a cleaning mechanism 20 which includes a stem 22. The stem 22 has a first end portion 24 attached to the body 10 and a second end portion 26 extending longitudinally away from the first end portion 24. The stem 22 may have a longitudinal cross-section that is either tapered or straight. Additionally, the stem 22 has a cavity 28 (see FIGS. 7 and 8) located within the stem 22 and extending between the first and second end portions 24, 26 of the stem 22. The cleaning mechanism 20 can provide a supply of water under pressure to deliver water to the cavity 28 of the stem 22. Furthermore, the stem 22 has at least one aperture 27 (see FIG. 8) located at the second end portion 26 to produce at least one water jet directed at the steam wand 14. It is envisaged that in other embodiments (not shown), the supply of water under pressure may be delivered from other locations (not shown) on the coffee machine (or externally of the coffee machine) to direct at least one water jet at the steam wand 14.

Figure 7:
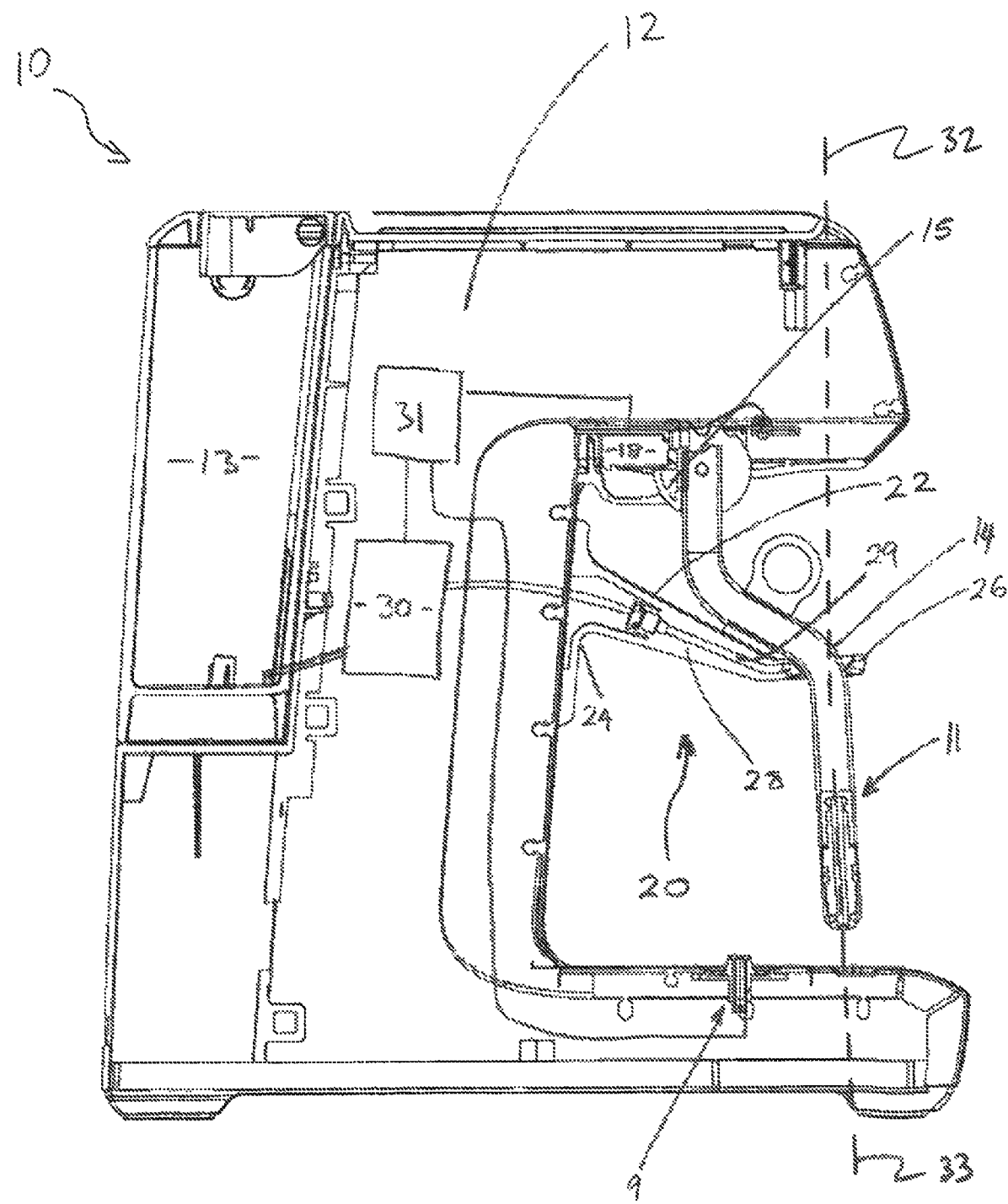
FIG. 7 is a schematic cross-sectional view of the coffee machine of FIG. 1, when the steam wand is in the second position.
Figure 8:
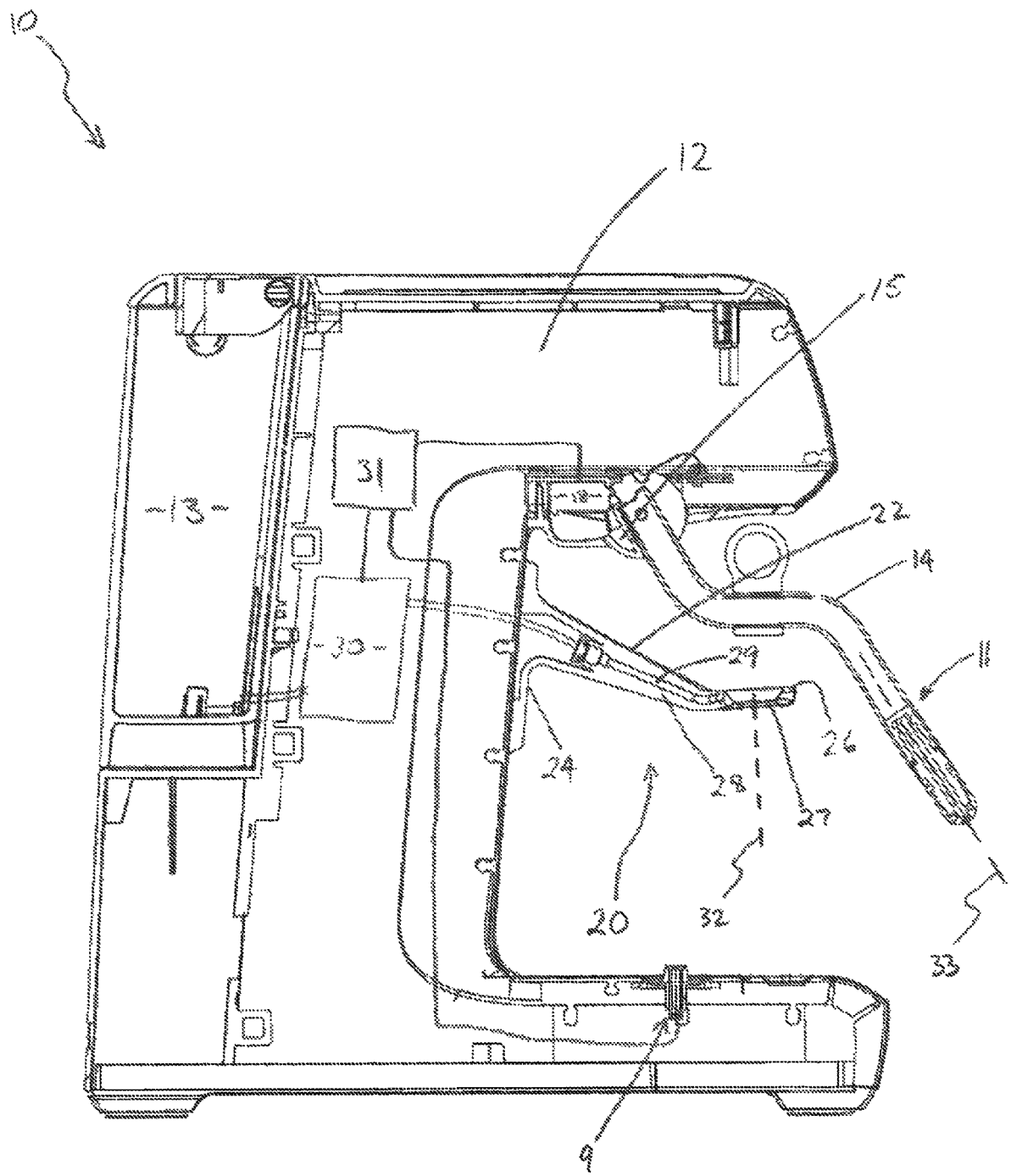
FIG. 8 is another schematic cross-sectional view of the coffee machine of FIG. 1, when the steam wand is in the first position.

As best shown in FIGS. 7 and 8, the coffee machine 10 has a water tank 13 mounted inside or integrated with the body 12. The water tank 13 is used to store water for both the steam wand 14 and the cleaning mechanism 20. There is also a pump 30 in fluid communication with the water tank 30 as well as the cavity 28. Preferably however, there is at least a conduit 29 located within the cavity 28 and the conduit 29 is in fluid communication with the pump 30. Alternatively, it is envisaged that coffee machine 10 may not be equipped with a pump and instead be connected to a pressurised water supply (not shown in the Figures).

Figure 2:
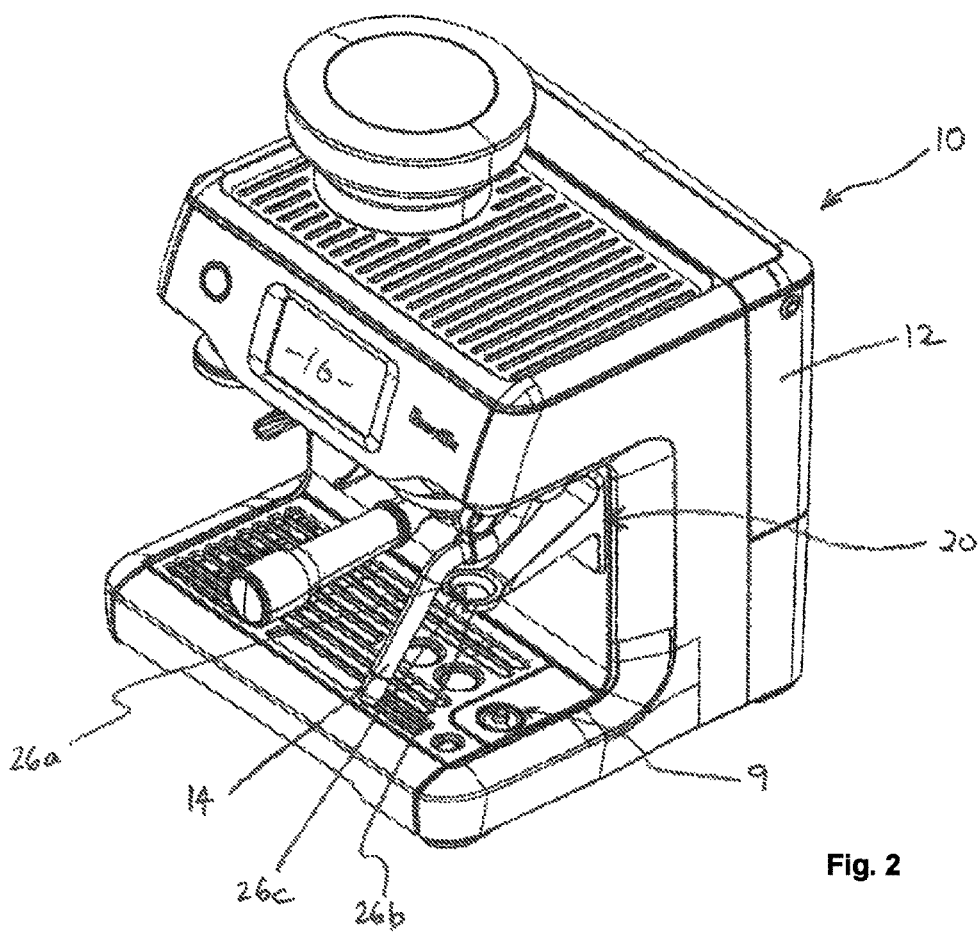
FIG. 2 is another perspective view of the coffee machine of FIG. 1, when the steam wand is in the first position.
Figure 3:
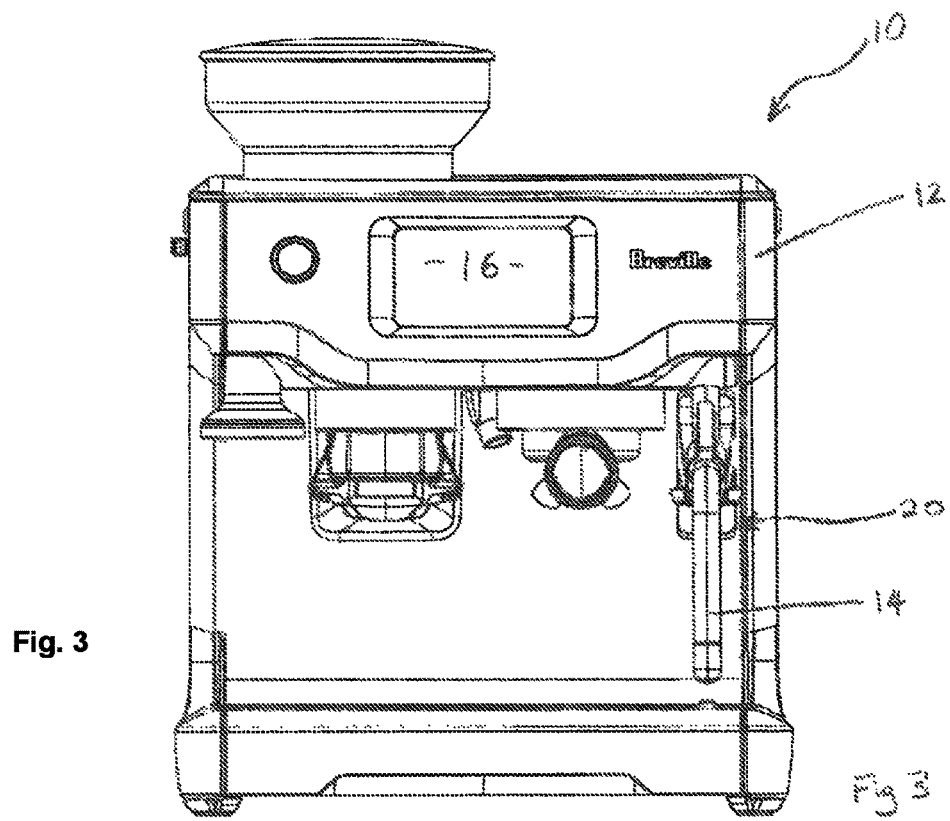
FIG. 3 is a front view of the coffee machine of FIG. 1.
Figure 4:
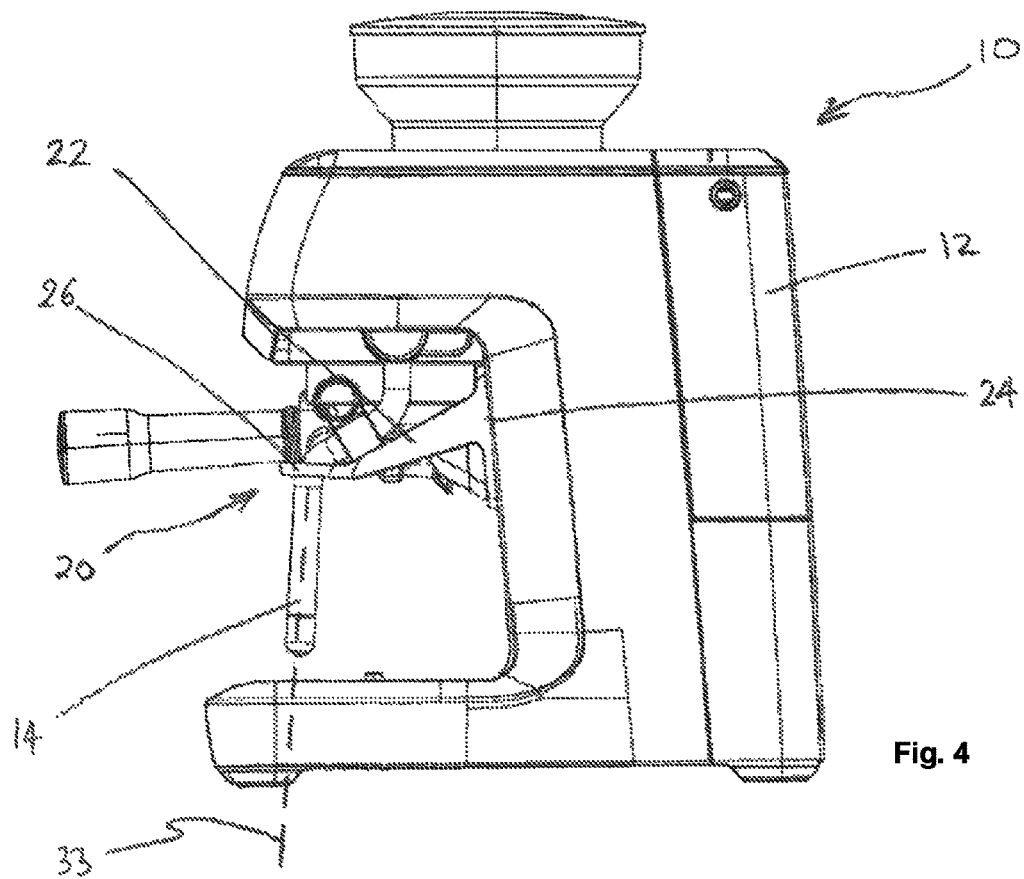
FIG. 4 is a side view of the coffee machine of FIG. 1, when the steam wand is in the second position.
Figure 5:
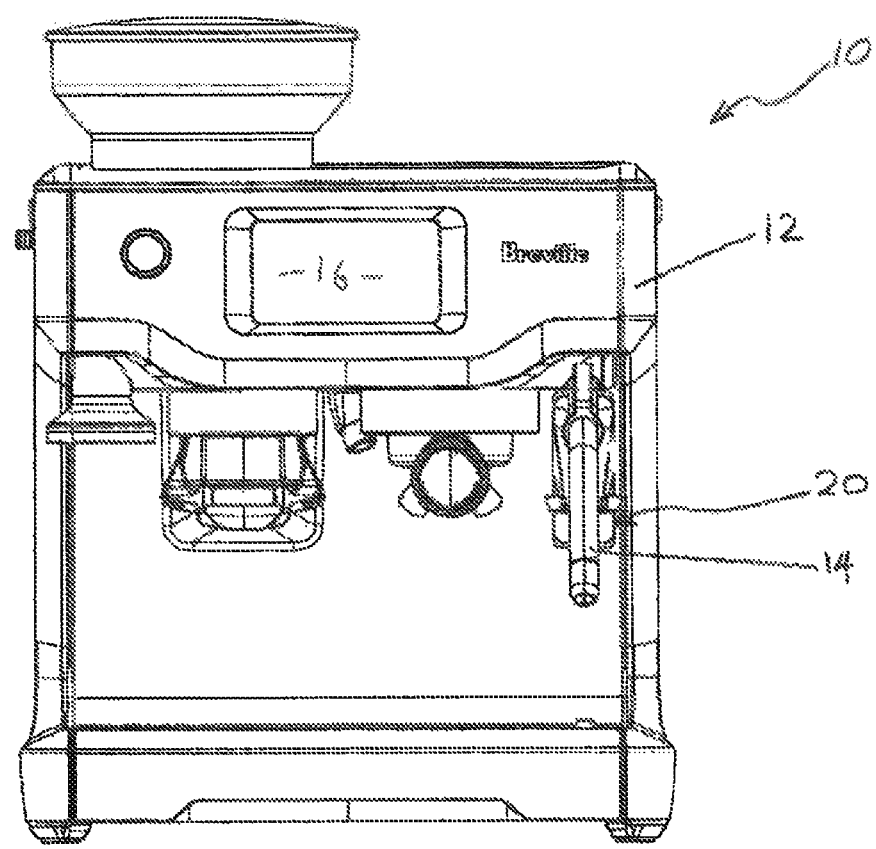
FIG. 5 is another front view of the coffee machine of FIG. 1.
Figure 6:
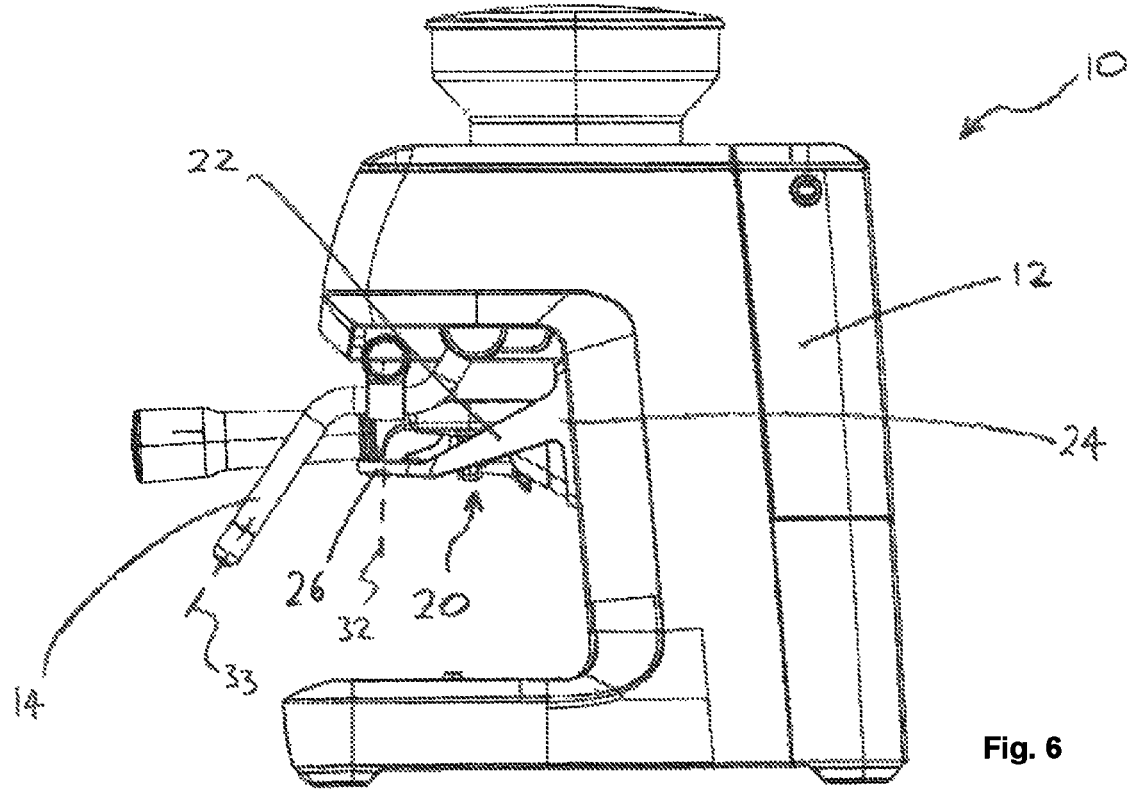
FIG. 6 is another side view of the coffee machine of FIG. 1, when the steam wand is in the first position.

Turning to the stem 22, the second end portion 26 is otherwise known as a head 26. The second end portion or head 26 of the stem 22 has at least one aperture 27 in fluid communication with the water supply. Preferably there is a plurality of apertures 27 such that pressurised water can exit said apertures 27 in the form of a water jet. The head 26 is arcuate in shape as best shown in FIGS. 2 and 4, and has two end extremities 26a, 26b which provide a gap 26c through which the steam wand 14 can pass, when the wand 14 is moved between a first position and a second position. The two end extremities 26a, 26b also define a central axis 32 therebetween (see FIG. 8), which extends generally through the center of the head 26.

With reference to the positions of the steam wand 14, the steam wand 14 is movable between the first position at which the wand 14 can froth milk, as shown in FIG. 2, and the second position where the wand 14 can froth milk and can also be cleaned by the cleaning mechanism 20, as shown in FIG. 1. In the second position, the steam wand 14 is closer to the stem 22 of the cleaning mechanism 20, than when the steam wand 14 is in the first position. Preferably, when the steam wand 14 is located in the second position, the steam wand 14 is positioned between the two end extremities 26a, 26b of the head 26, as shown in FIG. 7. In this position, the central axis 32 and a longitudinal axis 33 of the steam wand 14 may be coincident, or angularly offset from one another, depending on the cleaning requirements of the wand 14. It is therefore envisaged that an operator may use the cleaning mechanism 20 even if the steam wand 14 is positioned outside of the head 26, when in the second position.

Furthermore, as best shown in FIGS. 7 and 8, there is a switch 18 located in the body 12 of the coffee machine 10, and electrically connected to the pump 30. The switch 18 may be depressed or engaged by a projection 15 located on an upper portion of the steam wand 14.

There is also a safety mechanism 9 located in the body 12 of the coffee machine 10. The safety mechanism 9 is a switch, which may be in the form of a reed switch or an optical sensor. The safety mechanism 9 ensures that a jug (or any other container or object) is not present in the machine before the cleaning operation commence. The switch of safety mechanism 9 is located on the outer periphery of the base of the coffee machine 10, as best shown in FIGS. 7 and 8, and may function as a temperature sensor for the jug. The safety mechanism 9 is operable between a depressed and a released position, depending if the jug is present or not.

Use of the invention will now be described.

A microcontroller 31 receives a signal indicating that a milk frothing cycle is completed. The operator of the coffee machine 10 can then manually pivot the steam wand 14 from the first position as shown in FIG. 8, to the second position as shown in FIG. 7 (or alternatively, the steam wand 14 may pivot under electrical power as discussed below). In doing so, the projection 15 engages or trips the switch 18 to activate the cleaning mechanism 20. There may be about a 3 second delay to allow the operator to move their fingers away from the machine 10. After the delay, the pump 30 is activated and draws water from the tank 13. The water is then pumped under pressure through conduit 29 and allowed to escape at velocity from each aperture 27 of the head 26.

Alternatively, the pump 30 may be activated via a User Interface (UI) 16 with the operator pressing a function to cause the microcontroller 31 to activate the pump 30. In the UI activated scenario, when a wand cleaning mode is selected, the steam wand 14 can pivot under electrical power (using a motor not shown in the drawings) to the second position to be cleaned.

When the cleaning mechanism is activated by either the switch or the UI 16, the water expelled from each aperture 27 substantially cleans the wand 14 of any froth that remains on a lower portion 11 of the wand 14, as shown in FIG. 7. Typically, the froth build-up occurs at the lower portion 11 of the wand 14, specifically the portion of the wand 14 that is submerged in milk.

Additionally, for the cleaning operation to commence the switch 18 is depressed to indicate to the microcontroller 31 that the wand 14 is in the cleaning position (the second position). The safety mechanism 9 is released to indicate to the micro-controller that the jug is no longer on the base of the machine 10. Then after a preprogrammed time out, of about 5 seconds, the wand cleaning operations is started. In another embodiment the time out may be zero for immediate cleaning.

Figure 9A:
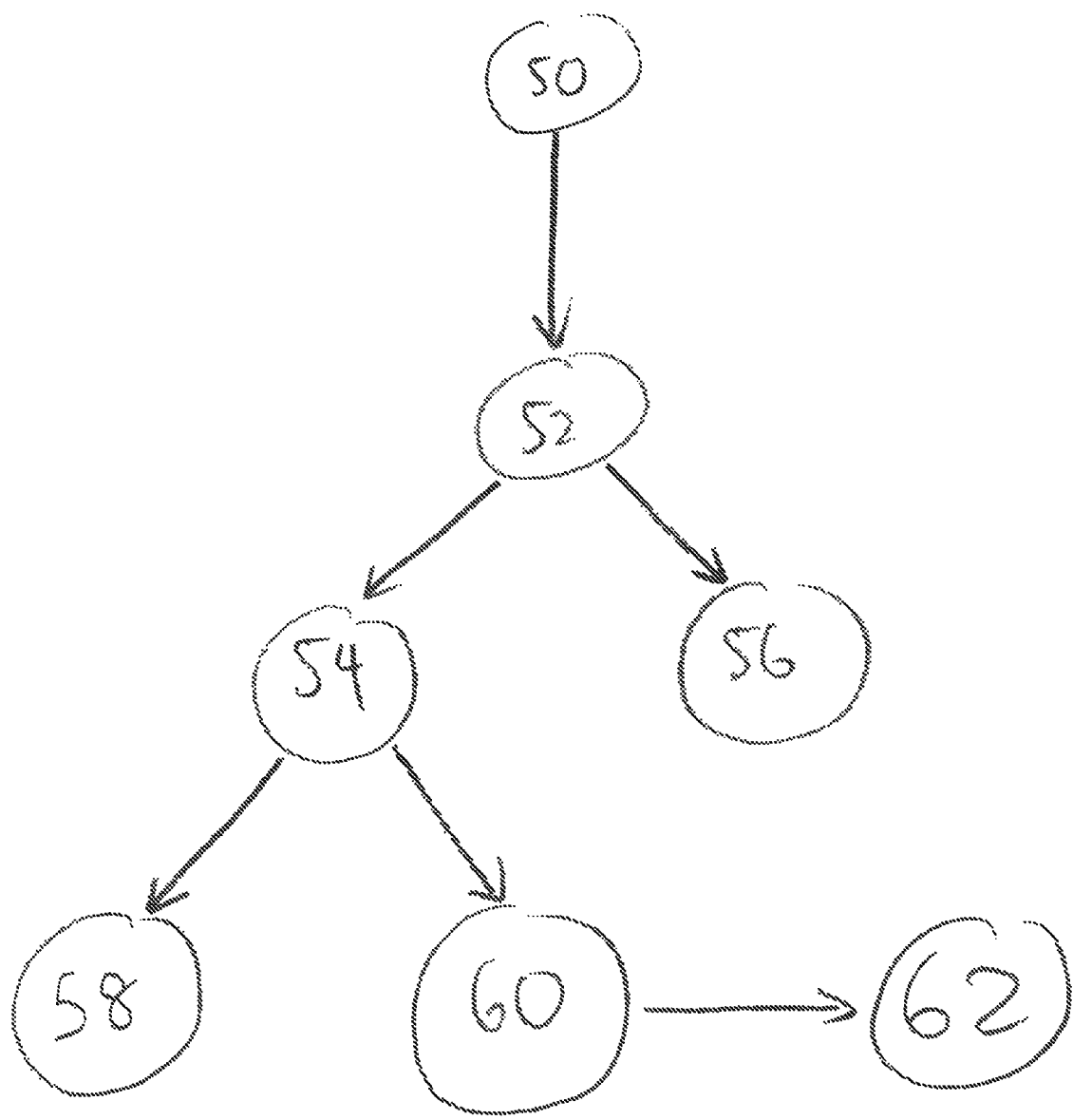
FIG. 9A is a schematic view of an operation logic of the coffee machine of FIG. 1 in a semi-automatic mode.

FIG. 9A of the accompanying drawings depicts an operation of the cleaning mechanism under a semi-automatic mode.

At step 50, the operator of the coffee machine 10 manually pivots the steam wand 14 from the first position to the second position.

At step 52, the microcontroller 31 determines (e.g. by way of a sensor, or by way of the existing switches or safety mechanisms) whether or not the steam wand 14 is in the second position. If the steam wand 14 is in the second position at step 52, the microcontroller 31 proceeds to determine whether or not a jug is present in the machine at step 54. Alternatively, if the steam wand 14 is not in the second position at step 52, a corresponding warning message is displayed on the UI 16 at step 56.

If a jug is present in the machine at step 54, then a corresponding warning message is displayed to the UI 16 at step 58. Alternatively, if a jug is not present in the machine at step 54, then the UI 16 proceeds to display a caution message to indicate that the cleaning process will commence at step 60. A time may also be displayed on the UI 16 to indicate the number of seconds before the cleaning process commences. At step 62, the pump 30 is activated and the cleaning process commences.

Figure 9B:
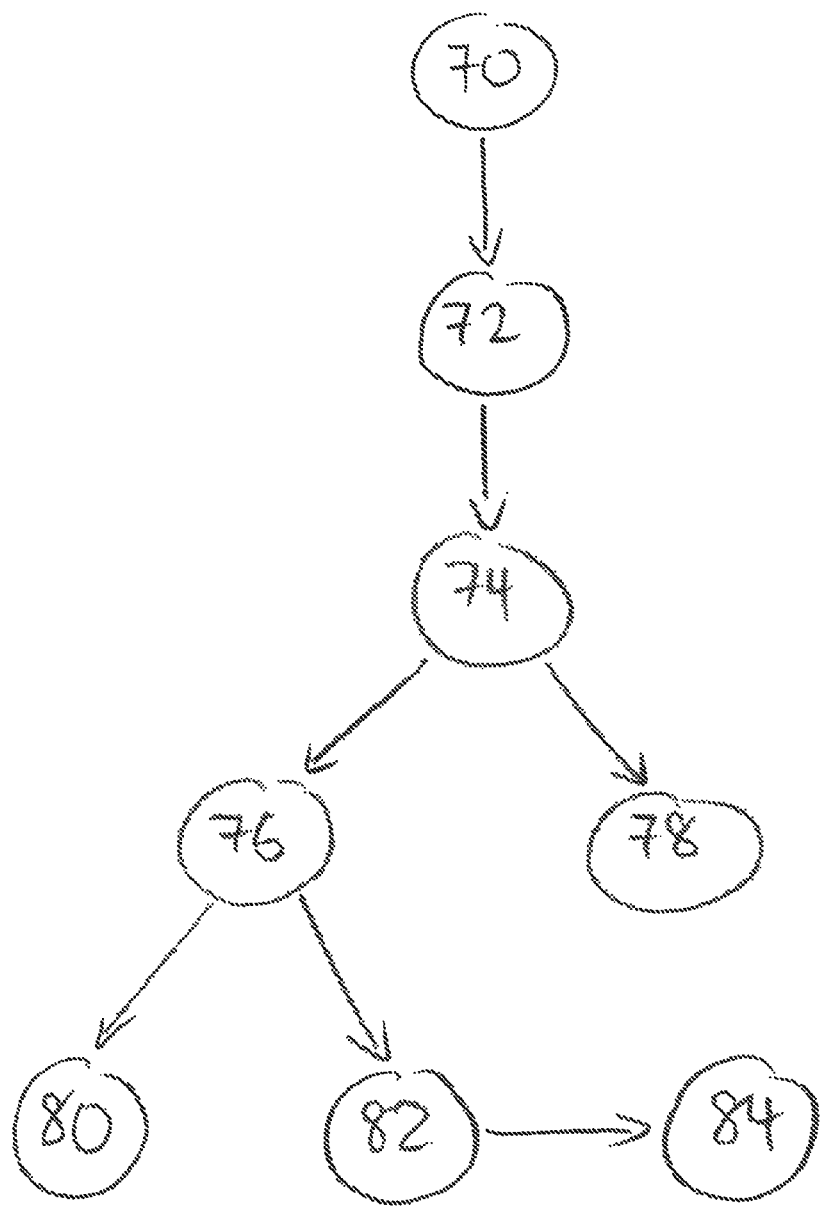
FIG. 9B is a schematic view of an operation logic of the coffee machine of FIG. 1 in an automatic mode.

FIG. 9B of the accompanying drawings depicts an operation of the cleaning mechanism under an automatic mode.

At step 70, the UI 16 receives a user input to activate a cleaning mode, and causes the motor to pivot the steam wand 14 under electrical power to the second position at step 72. The remaining steps generally follow the semi-automatic mode described above.

For example, at step 74, the microcontroller 31 determines (e.g. by way of a sensor, or by way of the existing switches or safety mechanisms) whether or not the steam wand 14 is in the second position. If the steam wand 14 is in the second position at step 74, the microcontroller 31 proceeds to determine whether or not a jug is present in the machine at step 76. Alternatively, if the steam wand 14 is not in the second position at step 76, a corresponding warning message is displayed on the UI 16 at step 78.

If a jug is present in the machine at step 76, then a corresponding warning message is displayed to the UI 16 at step 80. Alternatively, if a jug is not present in the machine at step 76, then the UI 16 proceeds to display a caution message to indicate that the cleaning process will commence at step 82. A time may also be displayed on the UI 16 to indicate the number of seconds before the cleaning process commences. At step 84, the pump 30 is activated and the cleaning process commences.

In FIGS. 10 to 18 of the accompanying drawings there is schematically depicted a device 110 to froth a liquid such as milk, for the purposes of providing frothed milk for coffee.

The device 110 includes a base 111 including a lower base portion 112 and an upper base portion 113. The lower base portion 112 includes a locating portion 114 (in the form of a depression) 114 that engages a jug 115 to locate the jug 115 at a predetermined position on the base portion 112.

The jug 115 has an open top 116.

Mounted in the upper base portion 113 is an assembly 117, that engages milk within the jug 15 to froth the milk.

The assembly 117 of this embodiment includes a stem 118 pivotally attached to the base portion 113 by means of a coupling 119. The stem 118 is fixed to the coupling 119 so as to move therewith. The lower portion 127 is enlarged in FIG. 10. The lower portion 127 includes a tube 145 having a plurality of through passages 46. Located internally of the tube 145 is a plurality of blades 147 projecting from a supporting hub 148. The hub 148 is rotatably driven by means of a motor 149 and shaft 150. Wiring 151 extends to the controller 140, so that the motor 149 receives electric power when required.

Rotation of the blades 147 relative to the tube 145 about the rotational axis 152 of motor 149 and shaft 150, causes the milk to flow radially outward through the passages 146, and to be drawn axially into the tube 145 to be engaged by the blades 147. This movement of the blades 147 relative to the passages 146 causes shearing of the milk and therefore frothing thereof.

The coupling 119 is attached to the base portion 113 by means of a pivot 120, the pivot 120 providing a generally horizontal pivot axis 121.

Figure 13:
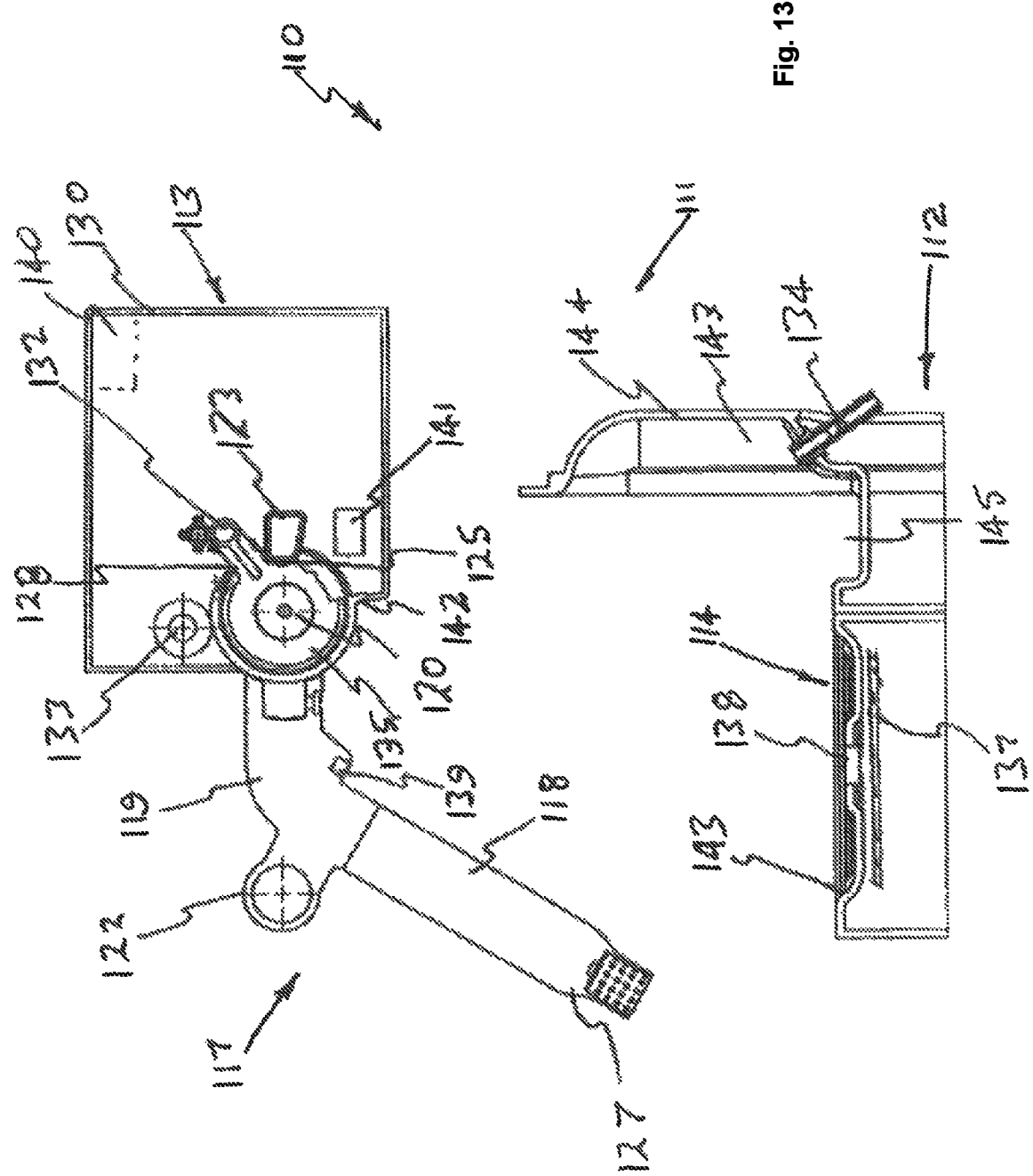
FIG. 13 is a schematic side elevation of the device of FIG. 10 in an alternative configuration.
Figure 14:
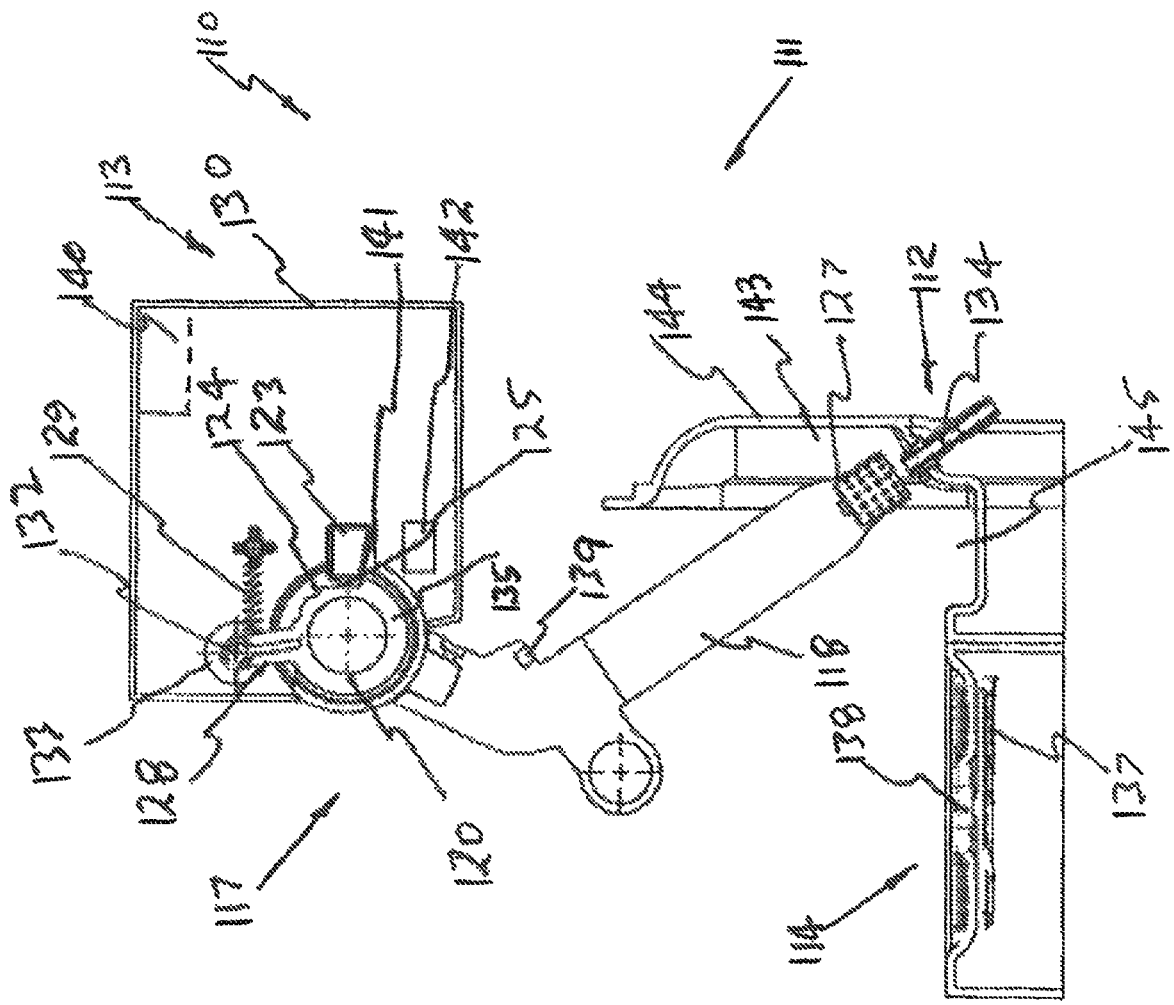
FIG. 14 is a schematic side elevation of the device of FIG. 10 in a still further configuration.

The coupling 119 is movable angularly about the axis 121 to locate the stem 118 at an operative position (shown in FIG. 10) at which the stem 118 is operable to froth the milk, a retracted position (as shown in FIG. 13) at which the stem 118 is located to enable movement of the jug 115 to and from the predetermined position provided by the locating portion 114, and a cleaning position (as shown in FIG. 14).

In this embodiment the operative position, retracted position, and cleaning position are spaced angularly from each other about the axis 121.

Preferably the coupling 119 is provided with a grip 122 that is engaged by the user's fingers to cause angular movement of the stem 118 and the coupling 119 about the axis 121 between the abovementioned positions.

A positioning member 23 is operable to retain the stem 118 in the desired position. The member 123 includes a spring loaded projection 125. A cam member 135 provides depressions 124. Engagement of the projection 125 in one of the depressions 124 aids in maintaining the stem 118 in the operative position. Another of the depressions 124, when engaged by the projection 125, aids in retaining the stem 118 in the retracted position. Preferably, the cam member 135 has an abutment surface 126 that engages the member 123, to locate the stem 118 in the cleaning position. The cam member 135 is fixed to the coupling 119.

The cam member 135 also includes an arm 128 that extends generally radially relative to the axis 121, with the arm 128 being engaged by a spring 129. The spring 129 is also attached to the housing 130 of the base portion 113. Angular movement of the stem 118 in the direction 131 about the axis 121 tensions the spring 129 so that the stem 118 is urged back to the operative position.

The radially outer end of the arm 128 is provided with a magnet 132 that cooperates with an electromagnet 133. When the stem 118 is moved to the cleaning position, the electromagnet 133 is operated and attracts the magnet 132. The stem 118 is then retained in the cleaning position. However, upon a cleaning operation being completed, the electromagnet 133 is deactivated, releasing the arm 128. Under the influence of the spring 129, the stem 118 then returns to the operative position.

In this embodiment, the base portion 112 has a horizontally open cavity 143, with a nozzle 134 mounted in the base portion 112 and directed upwardly at an acute angle into the cavity 143. The nozzle 134 is connected to supply of water under pressure, and provides an upwardly directed water jet.

As is best seen in FIG. 14, when the stem 118 is in the cleaning position, the lower end 127 (spearing head) thereof is located at a cleaning location with the nozzle 134 directed at the end 127 so that the water jet impacts against the lower end 127 of the stem 118, to clean the lower end 127 of the stem 118.

The shape of the wall 144 of the base portion 112, at least partly surrounds the cavity 143 and aids in retaining water that is deflected from the stem 118.

Additionally, the base portion 112 is provided with a water collection trough 145 that can be connected to a drain.

As an alternative, an electric motor 136, mounted in the base portion 113, is connected to the coupling 119 to cause angular movement thereof to move the stem 118 between the above described positions.

Upon completion of a milk texturing cycle, the stem 118 is moved manually, or automatically by the motor 136, to the retracted position to provide for removal of the jug 115. Thereafter, the stem 118 would be moved manually, or by the motor 136 to the cleaning position at which time water would be delivered to the nozzle 134 to clean and rinse the lower end 127.

Upon completion of a cleaning and rinsing cycle, the stem 118 would be moved manually or automatically to the operative position, ready for use.

Preferably the base portion 112 would include an induction coil 137 that is operated to heat the milk in the jug 115, while the base portion 112 would also include a temperature sensor 138 that detects the temperature of the jug 115, and therefore provides a signal indicative of the temperature of milk within the jug 115.

Preferably the device 110 includes a sensor 139 that detects the upper level of the milk in the jug 115. The sensor 139, together with the coil 137 and sensor 138 would be connected a controller 140 that would assist the device 110 in heating the milk to the correct temperature while operating the lower end 146.

In a further embodiment, the cam member 135 has a projection 141 that engages a switch 142 when the stem 118 is in the cleaning position. The switch 142 would cooperate with the controller 140 that would control deliver of water to the nozzle 134, and rotation of the impeller.

Figure 15:
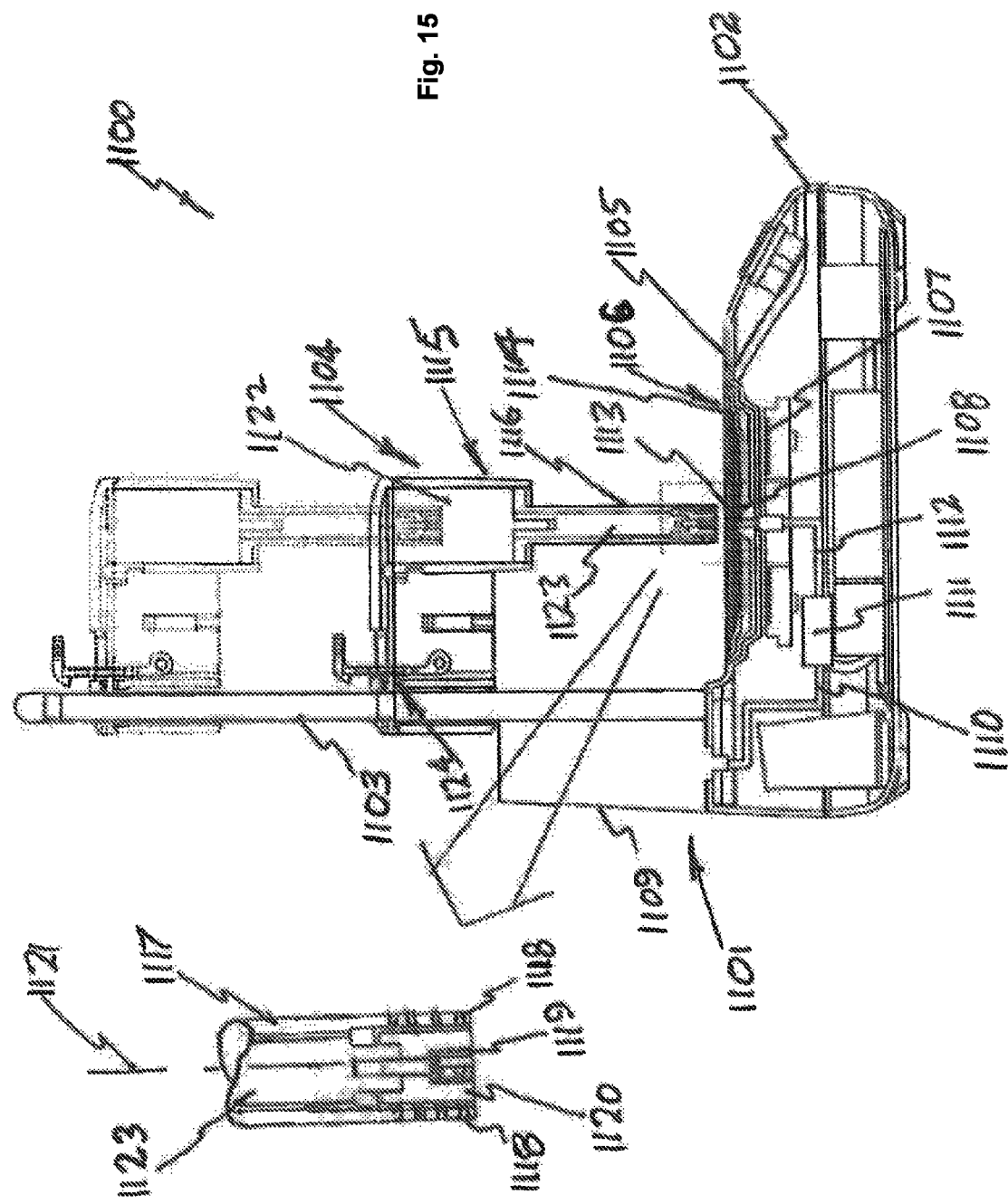
FIG. 15 is a schematic side elevation of a milk frothing device.

In FIG. 15 there is schematically depicted a device 1100 to texture (froth) milk. The device 1100 includes a base 1101. The base 1101 includes a lower base portion 1102 from which there upwardly extends a post 1103. The post 1103 supports an upper base portion 1104.

The upper base portion 1104 is mounted on the post 1103 so as to be movable generally vertically relative to the base portion 1102.

Figure 10:
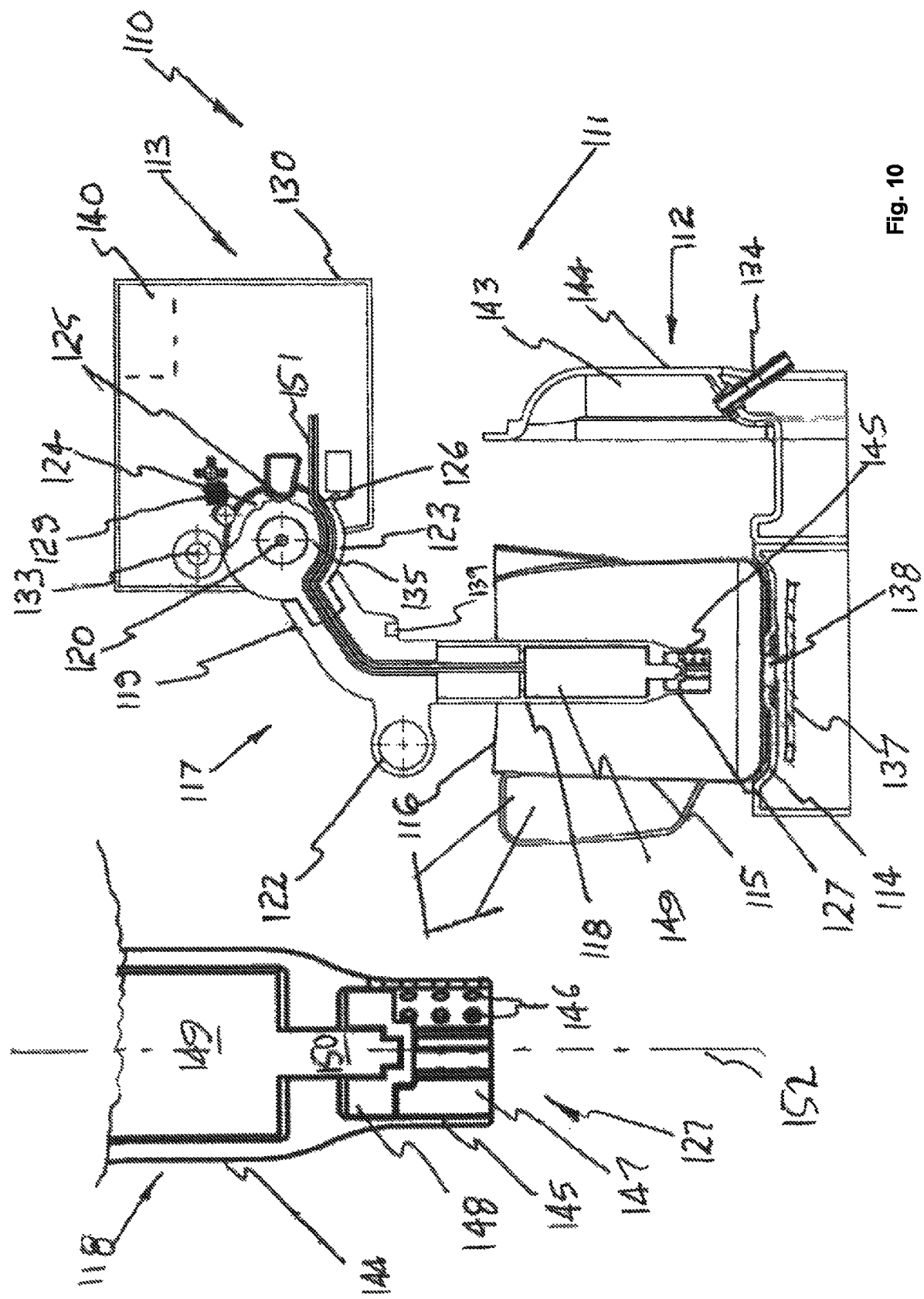
FIG. 10 is a schematic side elevation of a milk frothing device.
Figure 11:
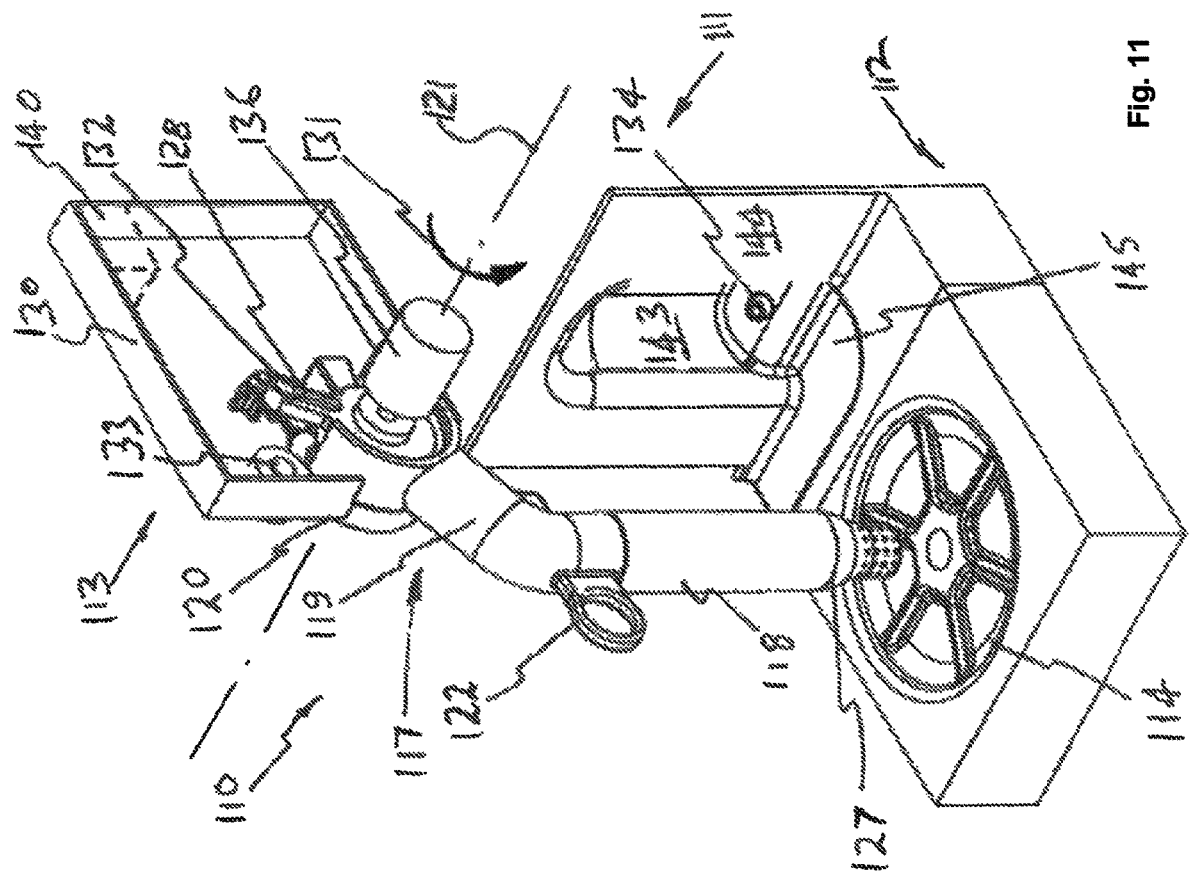
FIG. 11 is a schematic isometric view of the device of FIG. 10.
Figure 12:
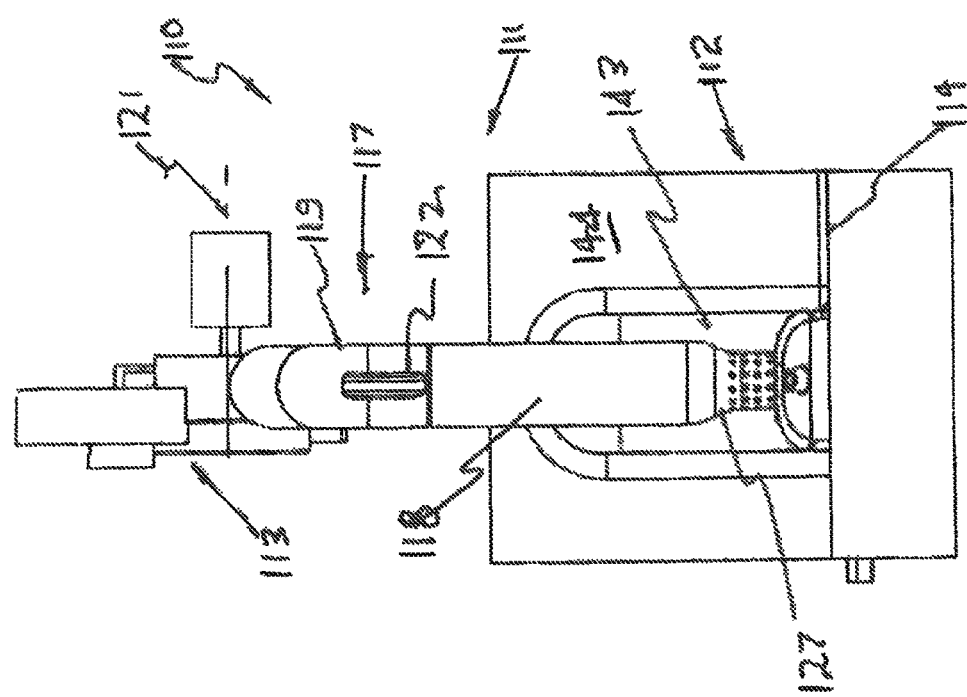
FIG. 12 is a schematic front elevation of the device of FIG. 10.

The base portion 1102 has an upwardly facing wall 1105 providing a depression 1106 that receives a jug as described with reference to FIG. 10.

Below the depression 1106 is an induction coil 1107 that would heat the jug mounted in the depression 1106. Also mounted in the wall 1105 a temperature sensor 1108 that senses the temperature of the jug as previously discussed.

Mounted on or formed integral with the base portion 1102 is a water reservoir (tank) 1109 that receives water. Extending from a lower portion from the reservoir 1109 is a tube 1110 that delivers water from the reservoir 1109 to an electrically operated pump 1111. Extending from the pump 1111 is a further tube 1112 extending to a nozzle 1113 that is in the centre of the depression 1106. Water under pressure provided by the pump 1111 causes the nozzle 1113 to provide an upwardly directed water jet.

Located in the depression 1106 is a tray 1114 that collects water provided by the nozzle 1113 and retains it for disposal. The tray 1114 has a central aperture through which the nozzle 1113 projects.

Secured to and supported by the upper base portion 1104 is a milk frother 1115. The milk frother 1115 includes a stem 1116. The stem 1116 includes an outer perforated member (sleeve) 1117 that has a plurality of apertures 118 at its lower end 1121.

Located internally of the member 1117, adjacent the apertures 1118, is an impeller 1119 that has a plurality of blades 1120 that extend radially relative to the longitudinal axis 1121 of the stem 1116. An electric motor 1122 drives the impeller 1119 by means of a shaft 1123.

Operation of the motor 1122 causes rotation of the shaft 1123 and therefore the impeller 1119. Milk is drawn upwardly into the lower end of the member 1117, and then is propelled radially outward through the apertures 1118 by the blades 1120. This operation causes frothing of the milk.

The milk frother 1115, and therefore the stem 1116, is height adjustable relative to the nozzle 1113. The milk frother 1115 is movable between an operative position at which the stem 1116 projects into the milk, so that the milk is frothed. The frother 1115 however can be moved upwardly to a retracted position providing for removal of the jug, and then returned to a cleaning position, at or close to the operative position at which the pump 1111 can be operated so that the nozzle 1113 delivers a water jet to clean the lower end 1121 and the impeller 1119.

Accordingly, the milk frother 1115 is height adjustable along a generally linear path to provide for location of the stem 1116 in an operative position with lower end 1121 of the stem 1116 located to froth the milk, and is movable from the operative position to a retracted position at which the jug can be removed. Thereafter, the milk frother 1111 may be lowered to a cleaning position. The cleaning portions can be at or adjacent the operative position so that the lower end 1121 is located at a cleaning location.

Preferably the upper base portion 1104 includes a catch 1124 that engages the post 1103 to retain the milk frother 1115 at a desired height relative to the lower base portion 1102.

Figure 16:
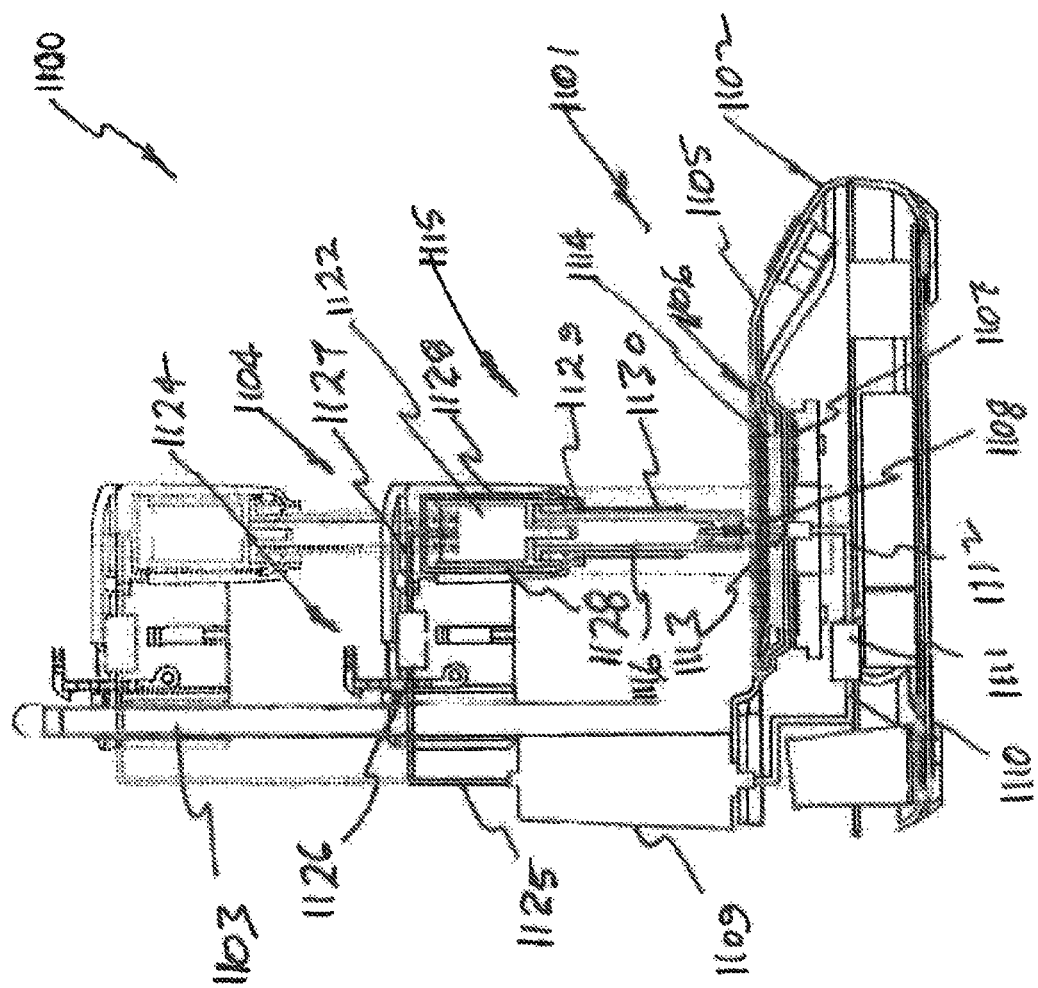
FIG. 16 is a schematic side elevation of a modification of the device of FIG. 15.

In FIG. 16 there is schematically depicted a modification of the device 1100 of FIG. 15. In this embodiment, a further tube 1125 takes water from the reservoir 1109 and delivers the water to a further pump 1126. The pump 1126 delivers water under pressure to a further tube 1127. The tube 1127 delivers water to a cavity 1128, that leads to an annular outlet 1129 so that a stream of water flows down the outer surface 1130 of the member 1117, to clean the surface 1130.

Figure 17:
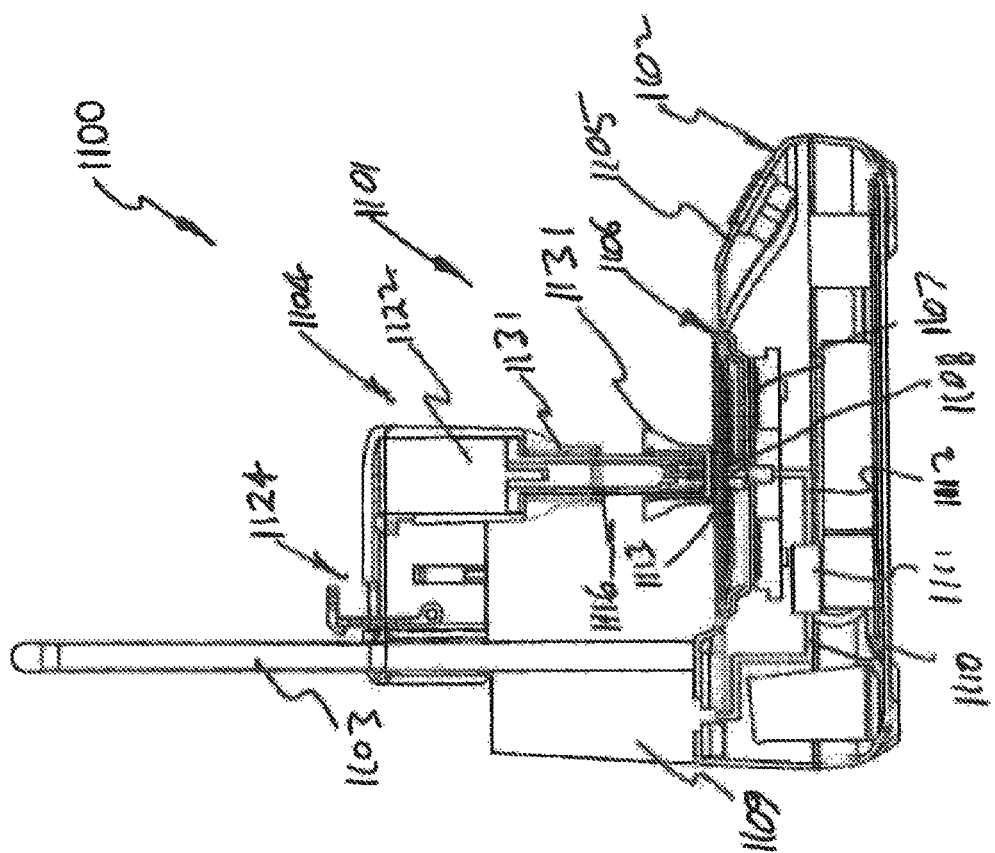
FIG. 17 is a schematic side elevation of a further modification of the device of FIG. 15.
Figure 18:
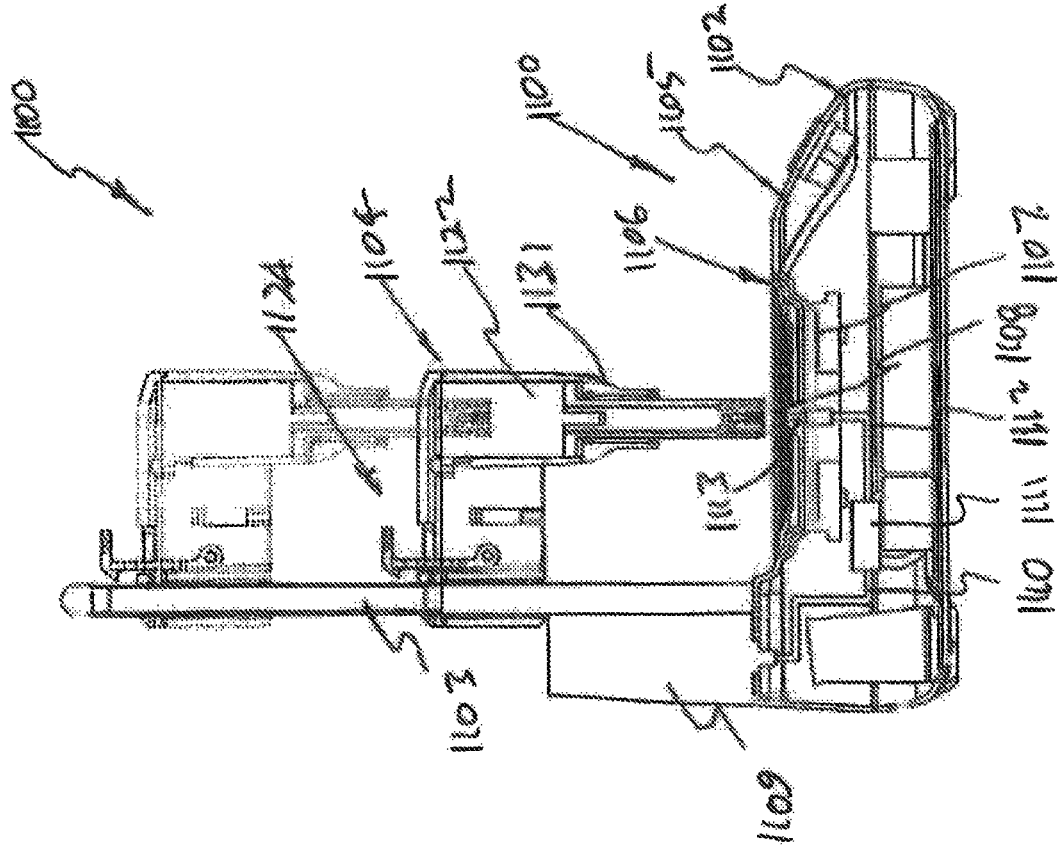
FIG. 18 is a schematic side elevation of the device of FIG. 17 in a further configuration.

In FIGS. 17 and 18 there is schematically depicted a modification of the device 1100 of FIGS. 15 and 16. In this embodiment, there is slidably mounted on the member 1117, a cleaning shroud 1131 that is slidable along the surface 1310 to clean the surface 1130.

Advantages of the present invention will now be described.

The present invention provides an automatic or semi-automatic cleaning of the steam wand by introducing a cleaning mechanism attached to the body of the coffee machine. The mechanism sprays water onto the milk frothing wand to rinse the wand. This removes substantially the need to use a cleaning cloth to wipe the wand.

Use of the present invention is more hygienic than using a cloth to wipe the wand. Furthermore, it reduces the likelihood of the steam wand nozzle becoming clogged, as clogging typically occurs when the operator uses a cloth to wipe clean the nozzle, particularly if a damp cloth is used.

Although the invention has been described with reference to specific examples, it will be appreciated by those skilled in the art that the invention may be embodied in many other forms.

The invention claimed is:

1. A coffee machine including:
   a body;
   a steam wand, to froth milk, attached to the body; and
   a cleaning mechanism, the cleaning mechanism including:
      a stem having a first end portion attached to the body, and a second end portion extending longitudinally away from the first end portion; and
      a supply of water under pressure to deliver water to the second end portion,
      wherein water under pressure is delivered to the second end portion to produce at least one water jet directed at the steam wand,
      wherein the steam wand is movable between a first position at which the steam wand froths milk, and a second position where the steam wand froths milk or is cleanable, wherein the second end portion has two end extremities which provide a gap, and wherein the steam wand passes through the gap when moving between the first position and the second position.

2. The coffee machine according to claim 1, wherein:
   the cleaning mechanism further includes a cavity extending between the first and second end portions of the stem;
   the supply of water under pressure delivers water to the cavity; and
   the stem has at least one aperture located at the second end portion and to which water under pressure is delivered to the cavity to produce the at least one water jet directed at the steam wand.

3. The coffee machine according to claim 1, wherein in the second position, the steam wand is closer to the stem of the cleaning mechanism, than when the steam wand is in the first position.

4. The coffee machine according to claim 3, wherein when the steam wand is moved to the second position, it engages a switch attached to the body of the coffee machine to activate a pump of the cleaning mechanism and thereby clean the steam wand.

5. The coffee machine according to claim 4, wherein there is a delay of about 3 seconds from when the switch is engaged to when the pump activates.

6. The coffee machine according to claim 3, wherein when the steam wand is in the second position, an operator selects a steam wand cleaning function located in a user interface of the coffee machine.

7. The coffee machine according to claim 1, wherein the supply of water under pressure is a pump mounted in the body.

8. The coffee machine according to claim 1, wherein the stem includes a head at the second end portion, the head having an aperture.

9. The coffee machine according to claim 8, wherein the head is arcuate shaped.

10. The coffee machine according to claim 1, further including a water tank to store water, the water tank being located within the coffee machine.

11. The coffee machine according to claim 10, wherein a pump is in fluid communication with the water tank, and each aperture and pumps pressurised fluid through each aperture of the head.

12. The coffee machine according to claim 11, wherein one or more conduits are in fluid communication with the water tank, pump and each aperture.

13. The coffee machine according to claim 1, wherein the steam wand has an aperture located at one end to expel steam, the cleaning mechanism directed to clean a portion of the end of the steam wand, when the steam wand is located in the cleaning position.

14. The coffee machine according to claim 1, further including a safety switch located in the base of the coffee machine to detect the presence or absence of an object on the base, whereby the cleaning mechanism is activated in the absence of the object on the base.

15. The coffee machine according to claim 1, wherein the steam wand is pivotally attached to the body to pivot about an axis between a first position at which the wand froths milk and a second position for cleaning the steam wand by the cleaning mechanism.

* * * * *